United States Patent [19]
Webster et al.

[11] Patent Number: 6,017,275
[45] Date of Patent: Jan. 25, 2000

[54] APPARATUS FOR INSERTING PINS

[75] Inventors: David Clark Webster, Arbroath, United Kingdom; Geoffrey Francis Seymour, Kilmacanogue, Ireland

[73] Assignee: Loctite (Ireland) Limited, Whitestown, Ireland

[21] Appl. No.: 08/765,393

[22] PCT Filed: Jul. 3, 1995

[86] PCT No.: PCT/GB95/01559

§ 371 Date: Mar. 18, 1997

§ 102(e) Date: Mar. 18, 1997

[87] PCT Pub. No.: WO96/01167

PCT Pub. Date: Jan. 18, 1996

[30] Foreign Application Priority Data

Jul. 2, 1994 [GB] United Kingdom .................. 9413355
Sep. 16, 1996 [GB] United Kingdom .................. 9418686

[51] Int. Cl.[7] .................................................. B21H 9/00
[52] U.S. Cl. ........................... 470/164; 470/48; 470/176; 470/179; 470/904
[58] Field of Search .............................. 470/4, 5, 44, 45, 470/46, 48, 49, 51, 164, 168, 169, 174, 176–180; 29/428–430, 432, 773, 798, 468, 520, 785, 788, 464; 221/171, 172; 53/420, 130.1, 133.1, 133.3, 133.4

[56] References Cited

U.S. PATENT DOCUMENTS

| | | | |
|---|---|---|---|
| 2,972,184 | 2/1961 | Andrew | 29/208 |
| 3,024,523 | 3/1962 | Donaldson | 470/48 |
| 3,121,281 | 2/1964 | Petro | 29/203 |
| 3,587,920 | 6/1971 | Avery et al. | 221/171 |
| 3,654,650 | 4/1972 | Burgess, Jr. et al. | 470/46 |
| 3,896,539 | 7/1975 | Pomernacki | 29/430 |
| 4,020,515 | 5/1977 | Goerke et al. | 470/164 |
| 4,058,866 | 11/1977 | Foster | 470/45 |
| 4,237,605 | 12/1980 | Jung et al. | 470/4 |
| 4,309,787 | 1/1982 | Lapohn . | |
| 4,309,820 | 1/1982 | Schindel | 470/4 |
| 4,453,308 | 6/1984 | Jackson | 470/179 |
| 4,470,194 | 9/1984 | Cambiaghi et al. | 470/4 |
| 4,732,296 | 3/1988 | Heck et al. | 221/172 |
| 4,960,360 | 10/1990 | Giannuzzi et al. . | |
| 5,161,302 | 11/1992 | Mueller | 29/773 |

FOREIGN PATENT DOCUMENTS 1571172  7/1969  France .

Primary Examiner—Joseph J. Hail, III
Assistant Examiner—Ed Tolan
Attorney, Agent, or Firm—Vidas, Arrett & Steinkraus

[57] ABSTRACT

Apparatus for inserting elongate members axially into receiving means has elongate member supply means to support and supply the elongate members continuously side-by-side substantially upright in a line. Indexed means serves to supply the receiving means relative to a delivery position and associated delivery means for insertion of the elongate members at least partially into the receiving means. A rotary indexed transfer wheel has spaced edge slots to receive and retain the elongate members in transferring said elongate members between the supply means therefor and said delivery position.

20 Claims, 2 Drawing Sheets

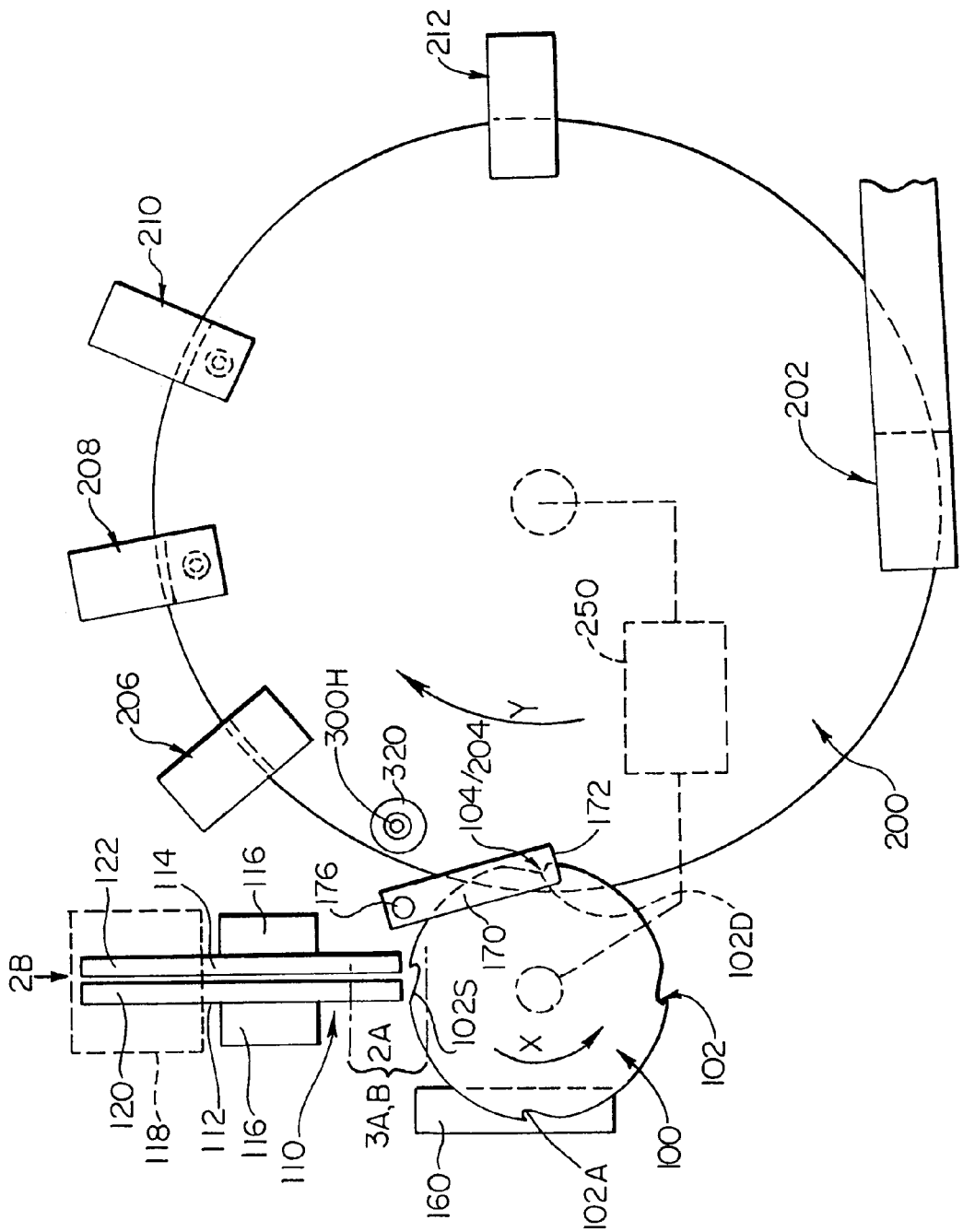

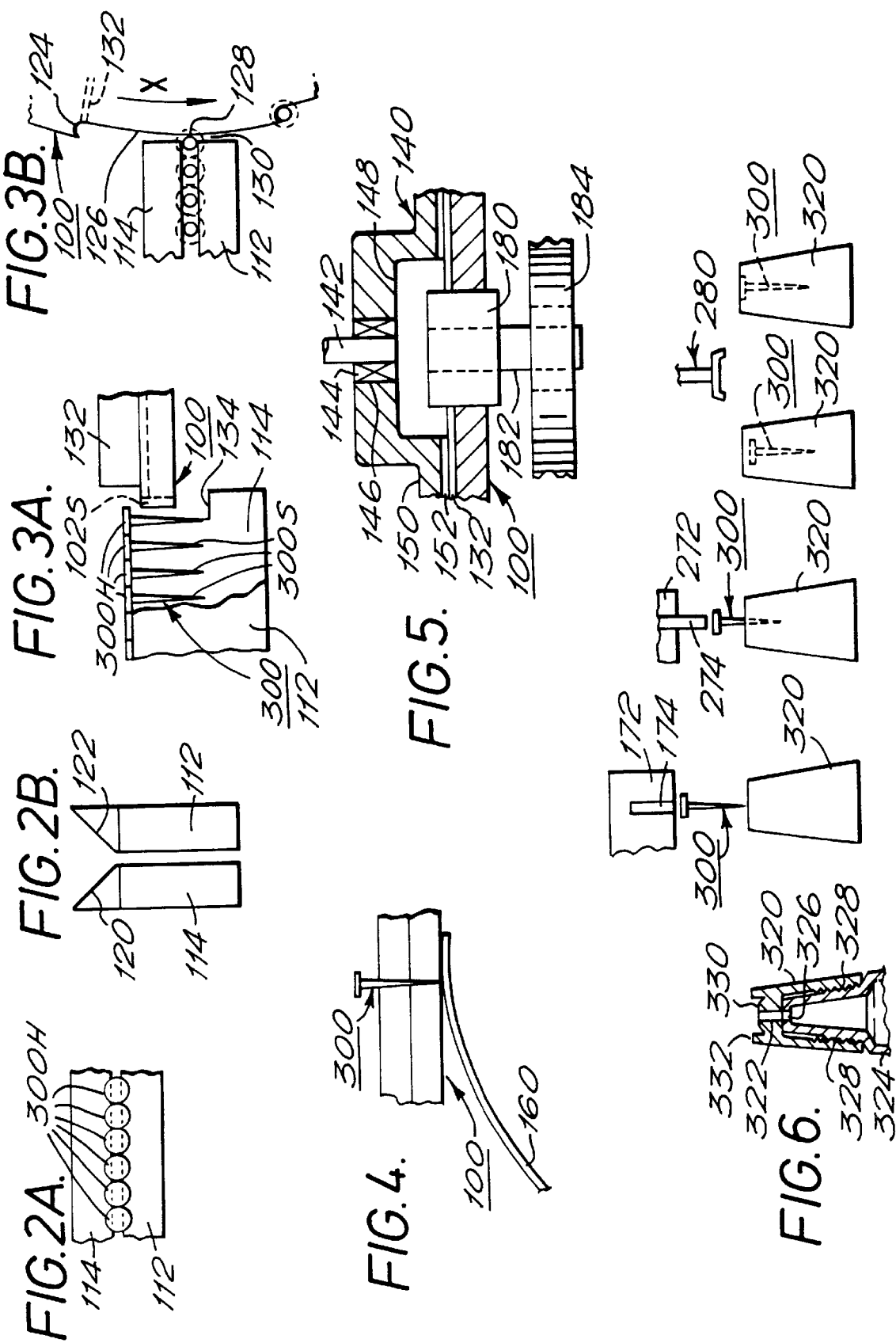

APPARATUS FOR INSERTING PINS

This invention relates to production equipment in which elongate, usually small, headed members are to be supplied in succession and have their unheaded ends accurately delivered into receiving means.

This invention has arisen from interest in adhesives, particularly supplying adhesives in containers from which they are readily dispensed, often in small quantities and feasibly successively at intervals over a considerable period of time. It is well known, particularly in relation to containers deformable to express their contents, for a dispensing part, often a spout-like end or nozzle, to have a pierceable seal as first supplied and be formed or adapted to receive a cap. Such dispensing part is often a sub-assembly subsequently itself associated with the adhesive-containing main body part of the container. First usage then involves removing the cap and piercing the seal. Nowadays, the seal is often an applied membrane and the cap can have a formation, then often of a quite shallow conical shape for breaking the seal. An external such formation would be operative after removal and temporary reversal of the cap, with further usages intendedly involving merely removal of the replaceable cap; and good usable condition of container contents relies on a good seal being made by the cap between usages. Internal such formations would be operative for first usage by further movement of the cap onto the dispensing part to break the seal, and the cap removed for each usage and refitted between usages for sealing by its internal formation.

Much older provisions included using a free pin to pierce the end of the dispensing part of the adhesive container, which end could be somewhat thinned but not necessarily or usually to an extent corresponding with more recent provision of a thin membrane. Often, such a pin was further intentionally to serve in resealing the container after use, even be the sole means for doing so, say where no cap was supplied.

Whilst irritatingly easy to lose, and representing prick-injury risks to the user, such pins had a particular potential advantage. Thus, their length can materially assist maintaining an adhesive exit passage clear; and do so relative to an optimally small exit orifice, at least if the pin can be accurately replaced repeatedly without unavoidably opening up that orifice. Accordingly, there is considerable attraction in a cap, perhaps particularly a screw-thread fitting cap, that incorporates an accurately located pin extending centrally internally from the closed end of the cap within and shielded by the confines of its skirt.

An obvious way to make such a cap, which will virtually invariably be of moulded synthetic plastics type these days, is to incorporate the pin at moulding of the cap. However, not only are mould tools more expensive and production rates inherently lower than for single part cap mouldings only, but any inaccuracy of pin placement and/or axial alignment can have a hole enlarging effect at fitting the cap with its integrated pin. This potential hole enlarging effect is inherent for screw-thread fitting caps; and, even within the small tolerances of incorporating mould tools, can be highly disadvantageous as a first-supplied state of adhesive containers. To supply first without penetration of the container by the pin would lead to much greater component lengths and complexity of inter-fitting to allow further axial movement of the cap on the container to achieve penetration, probably inevitably to a compromise by shortening the pin and giving up much of otherwise attractive passage clearing capabilities.

An alternative approach has been identified and investigated in relation to its potential to avoid such disadvantages. This investigated alternative involves inserting a pin through the cap after moulding of the cap, most advantageously also after making the required removable fixing of the cap to the dispensing part of the container. In principle, and as and when achieved successfully in practice, savings in moulding costs are accompanied by avoiding the above-mentioned first fixing problems and achieving excellent sealing characteristics by the pin for the container at least as first supplied. However, pins are difficult to handle with total reliability. Even the best of vibratory feeds for successive in-line supply of pins supported by their heads leads to jostling that militates against desired and acceptable reliability of picking them up and inserting them directly into the caps as a continuous production assembly operation at conjunction of respective feeds for the containers or their dispensing part sub-assemblies and the pins.

It is an object of this invention to overcome such problems, i.e. to achieve improved reliability of pin insertion and/or continuity of production assembly.

The apparatus and process of the present invention is applicable, generally, to the insertion of elongate members into a receiving means. It is especially applicable to elongate members comprising pins which may be headed or non-headed. Appropriate in-line feed mechanisms for use with headed vs. non-headed pins would be readily apparent to those skilled in the art. Furthermore, while the presemt invention is equally applicable to non-headed pins, for the sake of conveneince and clarity, the present invention will be described with particular reference to the insertion of headed pin members.

According to one aspect of this invention, there is provided apparatus for inserting elongate members axially into receiving means, comprising elongate member supply means to support and supply the elongate members continuously side-by-side substantially upright in a line; indexed means to supply the receiving means relative to a delivery position and associated delivery means for insertion of the elongate members at least partially into the receiving means; and a rotary indexed transfer wheel having spaced edge slots to receive and retain the elongate members in transferring successive said elongate members between the supply means therefor and said delivery position.

For supplying headed elongate members, such as pins as aforesaid, they may be held by, conveniently hanging down from, their heads. Preferably, the edge slots of the transfer wheel serve to engage only parts (herein called "shank parts") of such headed members that extend from their heads. This represents a considerable simplification of edge slot formation otherwise requiring ledging or other enlargement to accommodate the heads of such headed members.

The transfer wheel further preferably has associated means for axially adjusting the elongate members in the slots to achieve a desired location of their ends (unheaded for headed such members) for successive delivery into the receiver means.

In any event, for headed elongate members, preferred embodiments of this invention provide for the edge slots of the transfer wheel to engage the shank parts of the headed members at least at the delivery position with a spacing axially of the headed members between their heads and the transfer wheel,. and the delivery means can then serve to enter unheaded ends of the headed members into the receiver means to an extent not exceeding said axial spacing.

Preferred indexed means serving to supply the receiver means to the delivery position can then further serve to move the receiver means from said delivery position to another position with associated further means serving further to enter the headed members into the receiver means.

In one embodiment to be specifically described, the transfer wheel is horizontally disposed, i.e. with its rotation axis vertical, and then conveniently constitutes one station of another and larger horizontal turntable serving as the indexed means for supply and any other processing of the receiving means.

The elongate member supply means, for headed such members, preferably includes a vibratory track having spaced sides supporting the headed members by their heads and translating them in an in-line and heads-abutting relationship. For such vibratory track, preferred entry provision for the headed members is between surfaces sloping convergently down to the spacing between the sides of the vibratory track.

Preferred edge slots of the transfer wheel each have a leading end and a trailing end relative to rotation of the transfer wheel, and a maximum depth radially into the transfer wheel at the trailing end that not more than just fully accommodates the maximum cross-section of the elongate members, preferably of their shank parts alone for headed elongate members. The objective is to preserve rolling contact of the elongate members at exit from the supply means therefor. Further preferably, each of the edge slots of the transfer wheel has a progressively increasing depth radially into the transfer wheel from its leading to its trailing edge. Both of these edge slot features contribute materially to efficient and reliable pick-up and removal of the elongate members from a vibratory in-line feed track, the exit end of which can be closely adjacent the edge of the transfer wheel, certainly spaced by less than the maximum cross-section of the elongate members, preferably by less than cross-sections of their shank parts for headed elongate members. Circular such cross-sections promote smooth transfer by permitting, even promoting, desired mutual rolling of the elongate members.

Indeed, another aspect of this invention is seen in a rotary transfer wheel for elongate members presented in succession for pick up in edge slots of the transfer wheel, in which each of the edge slots has progressively increasing depth, preferably gradually, from its leading end to a maximum at its trailing end, which maximum is preferably less than the cross-section of an elongate member engaged thereat.

The transfer wheel can have internal passageway provisions to each of the edge slots for application of vacuum to retain the elongate members therein.

Application of this invention is not necessarily seen as limited to insertion of pins through caps of deformable dispensing containers in order to pierce, or sealingly enter a preformed orifice in, a dispensing part then accessible by cap removal. Indeed, there could be other useful applications, for example to inserting electrical connector pins into electric circuit boards.

However, a particular further aspect of invention is seen in use of a vibratory in-line feed for headed pins hanging from their heads in heads-abutting relation; a rotary substantially horizontal transfer wheel with edge slots of progressively increasing incursion to a maximum depth less than the cross-sections of the pins below their heads; and partial delivery of the pins through caps of dispensing nozzles for material containers with completion of delivery of the pins into the nozzles after removal from the transfer wheel; preferably further with prescribed height adjustment for the pins between pick-up of the pins by the transfer wheel and delivery therefrom.

Specific implementation for this invention will now be described, by way of example, with reference to the accompanying diagrammatic drawings, in which:

FIG. 1 is an outline plan view of an indexed main turntable 200 with an indexed subsidiary transfer wheel 100 for headed members and selected other stations;

FIGS. 2A and 2B are detail fragmentary intermediate plan and end views of a preferred vibratory feed for the headed members on their way to the transfer wheel 100;

FIGS. 3A, 3B and 3C are detail fragmentary central longitudinal and further plan views of the same vibratory feed at its exit end for transfer of the headed members to the transfer wheel 100;

FIG. 4 shows means associated with the transfer wheel 100 for axial adjustment of the headed members;

FIG. 5 is a fragmentary central sectional view through the transfer wheel 100; and FIG. 6 shows line diagrams for various stages of application of pins through caps of nozzle parts of material dispensing containers.

In the drawings, the amount of detail shown, including proportions and relative dimensions, is selected for clarity of representation within the context of what is readily available and/or within the knowledge and skill of those with reasonable engineering background in the field of production machines.

Referring first to FIG. 1, the transfer wheel 100 will be driven for indexed rotation in the direction of arrow X by rotary part turns corresponding to the number of its edge slots 102 so as to bring each in turn to a prescribed delivery position or station (104) shown at 104/204 overlying receiving station (204) of the main turntable 200 with diameters of the transfer wheel 100 and the main turntable 200 aligned through those stations 104 and 204. Positioning of a transferred pin 300 with its axis also on that line assists further operations as will become apparent. It is preferred that there be twelve equally spaced edge slots 102 in the transfer wheel 100, though only three are shown as being pertinent to supply (102S), axial adjustment (102A) and delivery (102D) operations to be described for headed members in the form of pins (300 in other Figures).

Associated with the transfer wheel 100 is an in-line vibratory feed 110 comprised of two spaced sides in the form of rails 112, 114 either or both of which is or are equipped with vibration inducing means 116 so that headed members will be held by, specifically supported hanging down from their heads, the rails 112, 114 as they travel along those rails towards the transfer wheel 100. The pins 300 can be supplied to the vibratory feed 110 from a hopper 118, conveniently quite simply by gravity assistance, but preferably into and between convergently downwardly sloping entry surfaces 120, 122. FIG. 2A shows the pins as so travelling in heads-abutting relation, and FIG. 2B shows the entry surfaces 120, 122 as triangular section additions to the rails 112, 114. The heads 300H of the pins 300 are shown much more exaggerated in size than is necessary in practice.

Actual transfer of the pins 300 from the vibratory feed track 110 is best appreciated from FIGS. 3A and 3B. Both show the heads-abutting relationship of the pins 300 in the vibratory track 110, and FIG. 3A most clearly shows them hanging from their heads between the rails 112, 114. FIG. 3B best shows the preferred shape of the edge slots 102 of the transfer wheel 100, all of which are the same. Maximum depth of the edge slots 102 radially into the transfer wheel 100 is at their trailing ends 124 shown curved to correspond with pins 300 whose shank parts 300S extending from their heads 300H (shown dashed only in FIG. 3B) are of circular section. A straight-line gradual decrease of radial depth for the edge slots 102 is indicated at 126 to vanishing point 128 at the leading ends of the edge slots 102. The terms "leading" and "trailing" are, of course, used relative to the direction of rotation of the transfer wheel 100 and the order in which those ends of the edge slots pass the exit end of the vibratory track 110.

As best seen in FIG. 3B, spacing 130 between the plain (i.e. un-slotted) edge of the transfer wheel 100 and ends of the vibratory track rails 112, 114 is considerably less than the maximum diameter of the shank parts 300S of the pins 300. The preferred rest position for the transfer wheel 100, i.e between its indexed movements, will be prior to the leading end of the next edge slot 102 to be loaded with a pin 300 (but after the trailing end of the last loaded edge slot). The end-most of the pins 300 will thus remain between the vibratory track rails 112, 114 and supported by their heads 300H until after its shank part 300S enters far enough into the next of the edge slots 102 to clear ends of those rails 112, 114.

Ideally, that will be when the shank part 300S reaches the trailing end 124 of that edge slot 102. The maximum depth of the edge slots 102 (at their trailing ends 124) will thus be close to the diameter of the pin shank parts 300S less the spacing 130 between the plain edge of the transfer wheel 100 and ends of the vibratory track rails 112, 114. In operation, as the edge slot 102 progresses past the end of the vibratory track rails 112/114, it captures the next pin and holds the same in the edge slot. As the transfer wheel 100 carries the pin away from the vibratory track, the next successive pin then advances to the end of the vibratory track rails awaiting capture by the next successive edge slot. Application of vacuum to the edge slots 102, particularly adjacent their trailing ends 124, see channels 132, serves both to hold the pins 300 by their shank parts 300S in the edge slots 102 and to seat the shank parts 300S snugly at those trailing ends 124.

More detail for application of vacuum is shown in FIG. 5 where the transfer wheel 100 has upper surface grooves as the channels 132 and a shallow top-hat shaped cover 140 with vacuum applied through connection 142 in a bearing 144 through a central aperture 146 to a chamber in the crown part 148 of the cover 140. The brim part 150 of the cover 140 stops short of the edge of the transfer wheel 100 by an amount at least accommodating the heads 300H of the pins 300, and is further shown with grooves 152 that register with and contribute to the radial vacuum channels 132 up to blind ends at the edge of the brim part 150.

These provisions ensure little risk of losing good pins 300 even with quite severe jostling at the end of the vibratory track 110. Effectively, the transfer wheel 100 normally serves neatly and-gently to pick the pins 300 off the end of an orderly queue of pins 300 waiting between the vibratory track rails 112, 114 with little jostling. It does not matter if the head 300H of a pin 300 drops to some extent lower than the tops of the rails 112, 114 during transfer into an edge slot 102 as axial adjustment takes place later. In the event of a pin 300 being lost, it should fall onto the step 134 (FIG. 3A only), which extends under the edge of the transfer wheel 100, and may be dished, disposed and configured to take such pins away to a bin for re-use or discarding as appropriate.

In the course of further indexed movements of the transfer wheel 100, the pins 300 in the edge slots 102 encounter axial adjustment provisions that are shown implemented in a particularly simple and effective way by an arching spring plate 160 making a curve up from below the transfer wheel 100 to bear partly against its underside and thus force sliding of the shank parts 300S of the pins 300 along the edge slots 102 thereby lifting unheaded ends of the pins 300 to a consistent position without disturbing snug fitting of the shank parts 300S in the trailing ends 124 of the edge slots 102.

The third indicated active station or position for the transfer wheel 100 is for delivery of the pins 300 at 104/204 into a receiver means, in this specific case, through a cap 320 for a material dispenser, particularly for adhesive. An arm 170 extends over the transfer wheel 100 and has a head 172 (see also FIG. 6) with an extendable and retractable plunger 174 that can be driven downwards, conveniently by compressed air applied at 176. When so driven, the plunger 174 will engage the lifted head 300H of the pin 300 then at the position 104/204, thereby also drive the pin 300 downwards and into the cap 320, but not to any extent beyond the edge of the transfer wheel 100, i.e with a stroke for the plunger 174 that is not more, preferably less than, the spacing of the pin heads 300H above the edge of the transfer wheel 100 after axial adjustment by the provision 160.

It is preferred that the cap 320 have a cored hole 322 (see left-most sectional view of FIG. 6) for receiving the shank parts 300S of the pins 300, further preferably slightly under-sized so that a tight seal is formed to a pin shank part 300S. It is also preferred that the caps 320 be presented for entry by the pins 300 already fitted to, thus complete with, a dispensing nozzle part 324 that may also have a similar cored hole 326 registering with the cap hole 322 and also to be sealingly entered by the pin shank parts 300S, further preferably partially achieved at the position 104/204. Screw thread fitting of caps 320 to nozzles 324 is preferred, see at 328 also in the left-most part of FIG. 6.

The main turntable 200 serves in presenting the cap-and-nozzle combinations 320/324 successively to the position 104/204, from delivery and placement station 202 which may be of any desired design. The main turntable 200 is indexed through part-turns of rotation in the direction of arrow Y, i.e. oppositely to the transfer wheel 100, so as to assist smooth disengagement of the pins 300 (then in the cap/nozzle items) from the edge slots 102 of the transfer wheel 100 as the latter preferably itself also moves away in a synchronised indexing of the transfer wheel 100 and the main turntable 200.

The main turntable 200 is indicated with further work stations, specifically a pin detection station 206, a further pin drive station 208, a spinning or heat-forming station 210, and a finished cap/nozzle removal station 212. The pin detection station 206 could operate in any desired way, for example optically or electromagnetically, in order to sense presence of a pin 300; and may selectively disable other stations 208, 210, 212, 202 if another pass is to be made through the station 104/204 for a cap/nozzle without a pin. Alternatively, of course, the next station could be another removal station activated by the pin detection station 206 indicating absence of a pin. Where a pin 300 is present, the next indicated station (210) may be of a plunger type (see 274 in FIG. 6) similar to the pin drive station at 104 for the transfer wheel 100, but with a different plunger stroke operative to complete driving the pins 300 fully home into the cap/nozzle combinations 220/324.

FIG. 6 further indicates preferred formation of the tops of the caps 320 with a shallow central dome 330 within an upstanding rim 322 that can be spun or heat-formed over to completely cover heads 300H of the fully home pins 300. Station 210 will serve that purpose in any desired way, see outline head indication 280 in FIG. 6. The stages of pin insertion, first partially into cap at station 104/204, then driven fully home in the station 208 and covering the pin head in station 210, are shown diagrammatically in FIG. 6.

A suitable coordinated drive system for the transfer wheel 100 and the main turntable 200 is indicated only diagrammatically at 250 in FIG. 1, and may be of any suitable type. FIG. 5 shows a drive hub 180 for the transfer wheel 100, with a shaft 182 and a gear wheel 184 to receive indexed drive from a common motor operating through other gearing along with the main turntable 200. It will be appreciated that suitable gearing can achieve a different number of indexed movements per full turn of rotation for the transfer wheel 100 than required for the Main turntable 200, but a system with the same number of indexed movements per full turn is equally feasible.

Prototype apparatus substantially as illustrated has performed very satisfactorily and exhibited tolerance as to the direction of the vibratory feed track 110 being other than strictly radial relative to the transfer wheel 100, whether in terms of its making of an angleto or its spacing from parallelism with radial: as to frequency of vibration applied to the vibratory track 110, including the customary 50 or 60 Hertz readily available directly from alternating-current electric mains supplies; and as to the shape of the lead-in parts 126 of the edge slots 102 being other than straight or flat, including even being formed with a convex bowing. However, attainment of highest transfer rates, whether as to speed of rotation of the transfer wheel 200 or as to providing more edge slots 102, can be materially aided by providing substantial radiality of the vibratory feed track 110 relative to the transfer wheel 100 and/or substantially straight/flat lead-in parts 126 of the edge slots and or increasing track vibration frequency, say doubling to about 100 to 120 Hertz, or more.

Another aid to attaining highest rates of transfer involves assisting pin separation or movement of the end-most one towards the transfer wheel and into the then-registering edge slot 102S. One suitable separation/movement inducing/enhancing means is shown in FIG. 3C by way of a nozzle 350 for applying compressed gas, normally air supplied, over double arrow line 350A, selectively between the two end-most ones of the pins 300 in the vibratory track 110.

We claim:

1. Apparatus for inserting elongate members axially into larger receiving means as installed and incorporated parts thereof, comprising supply means for relatively small said elongate members, continuously and supported side-by-side substantially upright in a line, for insertion into the larger receiving means; a rotary indexed transfer wheel having spaced edge slots to receive and retain the elongate members in transferring successive said elongate members between the supply means therefor and a delivery position having associated delivery means for insertion of the smaller elongate members at least partially into the receiving means; and indexed means to feed the receiving means successively to and from a delivery position for and after receiving said smaller elongate members, the apparatus constructed and arranged such that at the delivery position one of the spaced edge slots is adjacent to the indexed means.

2. Apparatus according to claim 1, wherein the elongate member supply means serves to support headed said elongate members hanging down from their heads.

3. Apparatus as in claim 1 further comprising means for assisting separation and entry into a said edge slot of the end-most one of said in-line elongate members.

4. Apparatus as in claim 2, wherein the edge slots of the transfer wheel serve to engage the headed elongate members at shank parts extending from their heads.

5. Apparatus as in claim 1, wherein the transfer wheel has associated means for axially adjusting the elongate members in the slots to achieve a desired location of their ends to be successively delivered into the receiver means.

6. Apparatus as in claim 1, wherein the edge slots of the transfer wheel serve to engage headed said elongate members at shank parts extending from their heads with, at least at the delivery position, a spacing axially of the headed elongate members between their heads and the transfer wheel; and the delivery means serves to enter unheaded ends of the headed elongate members into the receiver means to an extent not exceeding said axial spacing.

7. Apparatus as in claim 1, wherein the indexed means serving to supply the receiver means to the delivery position further serves to move the receiver means from said delivery position to another position with associated further means to further enter the elongate members into the receiver means.

8. Apparatus as in claim 2, wherein the headed elongate member supply means includes a vibratory track having spaced sides for supporting the headed elongate members by their heads and translating them in an in-line and heads-abutting relationship.

9. Apparatus as in claim 8, wherein the vibratory track has an entry provision for the headed elongate members between surfaces sloping down to spacing between the sides of the vibratory track.

10. Apparatus as in claim 8, wherein the vibratory track is substantially radial of the transfer wheel.

11. Apparatus according to claim 8, wherein the vibratory track is subjected to vibration at a frequency above 50 Hertz.

12. Apparatus as in claim 1, wherein each of the edge slots of the transfer wheel has a leading end and a trailing end relative to rotation of the transfer wheel, and a maximum depth radially into the transfer wheel at the trailing end that is less than would fully accomadate the cross-section of the elongate members engaged by the edge slots.

13. Apparatus as claimed in claim 12, wherein each of the edge slots of the transfer wheel has a progressively increasing depth radially into the transfer wheel from its leading to its trailing edge.

14. Apparatus as in claim 13, wherein the progressively increasing depth has a linear characteristic.

15. Apparatus as in claim 1 wherein the transfer wheel has internal passageway provisions to each of the edge slots for application of vacuum to retain the elongate members therein.

16. Apparatus as in claim 11 wherein the vibratory track is subjected to vibration at a frequency of 100 to 120 Hertz.

17. Apparatus for inserting elongate members axially into larger receiving means, the receiving means having a top and a bottom comprising:

a supply means for supplying the elongate members continuously and supported side-by-side substantially upright in a line, for insertion into the larger receiving means;

a rotary indexed transfer wheel having spaced edge slots to receive and retain the elongate members in transferring successive elongate members between the supply means therefor and a first delivery position having associated delivery means for insertion of the elongate members partially into the receiving means, the elongate member not extending beyond the bottom of the receiving means; and indexed means to feed the receiving means successively to and from the first delivery position for and after receiving said smaller elongate members, the apparatus constructed and arranged such that at the first delivery position one of the spaced edge slots is adjacent to the indexed means, the indexed means further transferring the receiving means and elongate member from the first delivery position to one or more additional delivery positions having associated additional delivery means to further insert the elongate member into the receiving means.

18. The apparatus of claim 17 comprising one additional delivery position and associated additional delivery means whereby the elongated member is delivered further into the receiving means.

19. The apparatus of claim 18 wherein the associated additional delivery means are constructed and arranged so that the elongate member does not extend beyond the bottom of the receiving means.

20. Apparatus for inserting pin shaped elongate members axially into larger receiving means, the receiving means having a top and a bottom comprising:

a supply means for supplying the relatively small elongate members continuously and supported side-by-side substantially upright in a line, for insertion into the larger receiving means;

a rotary indexed transfer wheel having spaced edge slots to receive and retain the elongate members in transferring successive elongate members between the supply means therefor and one or more delivery positions having associated delivery means for insertion of the elongate members partially into the receiving means and indexed means to feed the receiving means successively to and from a first delivery position for and after receiving said smaller elongate members, the elongate members at least partially inserted into the receiving means at the first delivery position while the elongate members are retained within a said spaced edge slot, the indexed means further transferring the receiving means and elongate member from the first delivery position to one or more additional delivery positions having associated additional delivery means to further insert the elongate member into the receiving means, the elongate member not extending beyond the bottom of the receiving means.

* * * * *

UNITED STATES PATENT AND TRADEMARK OFFICE
CERTIFICATE OF CORRECTION

PATENT NO.   : 6,017,275
DATED        : January 25, 2000
INVENTOR(S)  : Webster et al.

It is certified that error appears in the above-identified patent and that said Letters Patent is hereby corrected as shown below:

Column 2,
Line 25, should read -- while the present --.
Line 27, should read -- sake of convenience --.

Signed and Sealed this

Seventeenth Day of February, 2004

JON W. DUDAS
*Acting Director of the United States Patent and Trademark Office*